3,105,819
LUBRICATING COMPOSITIONS
William S. Anderson, Oakland, Calif., assignor to Shell Oil Company, a corporation of Delaware
No Drawing. Filed Dec. 21, 1959, Ser. No. 860,716
5 Claims. (Cl. 252—49.9)

This invention relates to lubricants and particularly to detergent mineral oil lubricants and to an improved class of polymeric additives therefor.

It is well known that the high pressure occurring in certain types of gears and bearings may cause rupture of lubricant films with consequent damage to the machinery. It is known that various base lubricants can be improved in their protective properties of rubbing surfaces by the addition of certain substances, so-called extreme pressure agents, so that excessive wear, scuffing and seizure are minimized or prevented.

It is also known that certain compounds of metal-reactive elements, such as certain compounds of chlorine, sulfur and phosphorus, as well as certain other compounds, such as some compounds of lead, impart extreme pressure properties to various lubricants. Notable among the substances heretofore used are the lead soaps, phosphoric acid esters, free or bound sulfur and certain chlorinated organic compounds. A principal objection to many of these extreme pressure agents is their lack of detergency and their high reactivity with the metallic surface. Another objection to chemically reactive extreme pressure agents is that they alter the original chemical nature of the contacting surface, which under certain conditions is undesirable. Additionally, because of the activity of agents of this type, they usually are depleted rapidly resulting in only a temporary solution to the problem of extreme pressure lubrication.

It has now been discovered that excellent detergent and wear inhibiting lubricants are provided by addition to lubricants of from about 0.1% to about 10%, preferably from about 1% to about 5% of an oil-soluble polyphosphonated copolymer of ethylene and a lower monoalkyl ethylene such as ethylene and propylene and ethylene and butene-1 or mixtures thereof, the ethylene precurser comprising at least 20% of the total mixture and at least 10%, and preferably 15–40% of the phosphonated copolymer being alkyl phosphono units represented by:

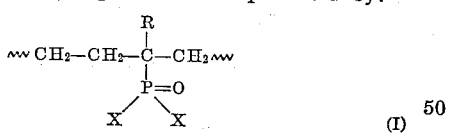
(I)

where the R is a $C_{1-4}$ alkyl radical, preferably a —$CH_3$ radical, the X's are the same or different polar groups selected from the group consisting of halogen, e.g., chlorine or bromine, or where X is —YR' and where Y is oxygen or sulfur and R' is hydrogen, or a hydrocarbyl radical, such as $C_{1-20}$ preferably $C_{4-18}$ alkyl, cycloalkyl, aryl or aralkyl radical or a cation such as an amine, e.g., $C_{1-18}$ alkyl amine, polyamine, e.g., an alkylene diamine, a heterocyclic amine, e.g., alkyl substituted pyridine, etc. The molecular weight of the copolymer may range from about 10,000 to about 500,000, preferably from 100,000 to 300,000.

In addition to the copolymer of this invention containing units (I) the product may contain additionally a lesser amount of units represented by

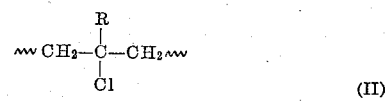
(II)

normally about 2–15% of the units (I).

The oil-soluble phosphonated copolymer such as ethylene/propylene copolymer is prepared by reacting an elastomeric ethylene/propylene copolymer made by the procedures and techniques described in Irish patent application 695/56 with phosphorus chloride under oxidizing conditions, such as by blowing air or oxygen through the reaction mixture under controlled temperature conditions. In essence the intermediate product, that is the elastomeric copolymer, is produced by polymerizing a mixture of ethylene and propylene in the presence of an inert hydrocarbon solvent with a catalyst of the Ziegler type which essentially is a reaction product of a metalloalkyl compound of groups I, II or III and a metal halide such as vanadium chloride or vanadium oxychloride. The ratio of ethylene to propylene monomers that is maintained during the polymerization will vary depending on the proportion of the respective monomers desired in the final elastomer. In the preferred embodiments the elastomer may contain from about 20 mole percent to about 90 mole percent, preferably 30–50 mole percent of ethylene units in the copolymer and still be useful in the formation of the elastomer. Because the monomers do not polymerize at the same rate, i.e., ethylene polymizes faster than propylene, the ratio of the starting mixture of monomer is not the same as that desired in the final product and this is one of the major considerations in selecting the starting monomer ratios to give a particular final product. Other considerations are the choice of catalyst components and their respective proportions and the polymerization conditions. By way of illustration, Table I indicates variations of ethylene units in the final elastomer as the ratio of ethylene to propylene in the starting monomer mixture is varied. For this table, polymerizations were conducted at 45–65° C. in n-heptane solvent and the catalyst was the reaction product of trihexylaluminum and vanadium oxychloride in a mole ratio of 3.0:1.

TABLE I

| Mole Percent Ethylene in Feed Gases | Mole Percent Ethylene in Copolymer |
|---|---|
| 8.0 | 24.0 |
| 18.0 | 48.1 |
| 26.0 | 57.7 |
| 32.0 | 62.4 |
| 50.0 | 80.3 |

Other suitable alkyl aluminum compounds as the catalyst component include trioctyl aluminum, trinonyl aluminum, tridecyl aluminum, triisobutyl aluminum, and others. Preferably the alkyl radicals of the trialkyl aluminum have more than 4 carbon atoms but not more than 16 carbon atoms. For economic reasons, the number of carbon atoms in the alkyl radicals preferably range from 4 to 10. The ratio of the aluminum compounds to the vanadium oxychloride or vanadium tetrachloride may vary widely but preferably the aluminum to vanadium mole ratio is greater than 2. The catalyst is simply prepared by mixing and reacting the catalyst components in a hydrocarbon solvent whereupon there is formed a reaction product which is the catalyst.

The final oil additive product of this invention is obtained by reacting an elastomeric ethylene-propylene copolymer of the type described above with phosphorus trichloride, phosphorus oxychloride, phosphorus tribromide, etc. in an inert solvent under oxidizing conditions, such as by blowing air or oxygen through the mixture at controlled temperatures of from about 0° to 60° C., preferably at 10–35° C. The resulting polyphosphonyl halide-containing copolymer can be hydrolyzed to form the polyphosphonic acid and the acid esterified or converted into salts by suitable means. The time required for completing the reaction depends upon the number of units (I) which are desired to be provided in the copolymer as well as the ratio of the reactants and the reaction temperature. In general, the time required to complete the reaction may vary from 2 to 48 hours or more.

The following examples are given as illustrative of the present invention.

*Example I*

To a mixture of 222 grams of Ziegler type copolymer of 50% ethylene and 50% propylene having an intrinsic viscosity of 5.5 dl./g. in 2.8 liters of benzene was added dropwise 365 grams of $PCl_3$ over a period of 3 hours while simultaneously bubbling oxygen through the mixture and controlling the temperature of the reaction at 12–34° C. by ice cooling the reaction vessel. About 550 ml. of methanol was then slowly added, and the resulting HCl swept out with nitrogen. To the product about 1 gram of a phenolic anti-oxidant[2,2′ - methylene bis(4-methyl-6 - tert·butylphenol)] was added as well as 625 ml. of pyridine and the entire mixture was cooled and allowed to stand for 48 hours. The pyridine salts were filtered off and the polymer precipitated by adding methanol and then reprecipitated three times from benzene into methanol. On analysis the resulting mixed methyl phosphonate-phosphonyl chloride containing ethylene/propylene copolymer contained 2.41% phosphorus and 0.983% chloride corresponding to 14% of the ethylene/propylene copolymer units containing the phosphono group.

Following the above procedure, the following phosphono-modified elastomeric copolymers of ethylene/propylene having an intrinsic viscosity in the range of 1 to 10 dl./g. were prepared:

II. Poly(dibutylphosphonate) of ethylene/propylene copolymer having intrinsic viscosity of 2 dl./g.

III. Poly(dihexylphosphonate) of ethylene/propylene copolymer having intrinsic viscosity of 3–4 dl./g.

IV. Poly(dilaurylphosphonate) of ethylene/propylene copolymer having intrinsic viscosity of 5 dl./g.

V. Poly(stearylacid phosphonate) of ethylene/propylene copolymer having intrinsic viscosity of 2 dl./g.

VI. Poly(dicyclohexyl phosphonate - phosphonylchloride) ethylene/butene-1 copolymer having an intrinsic viscosity of 4–6 dl./g.

The non-ash polymeric additives of this invention effectively impart detergency and prevent wear in a variety of petroleum lubricating stocks. The lubricating oil base is suitably selected from various synthetic oils or natural hydrocarbon oils having a viscosity range of from 50 SUS at 100° F. to 250 SUS at 210° F. (SAE viscosity number ranging from SAE 5W to SAE 90). The natural hydrocarbon oils are obtainable from paraffinic, naphthenic, asphaltic or mixed base crudes, and/or mixtures thereof. Useful synthetic oils include polymerized olefins, alkylated aromatics, isomerized waxes, copolymers of alkylene glycols and alkylene oxide (Ucon fluid, U.S. 2,425,755, 2,425,845 and 2,774,733) organic polyesters such as esters of an aliphatic dibasic acid and a monohydric alcohol, such as di-2-ethyl hexyl sebacate or di-2-ethyl hexyl adipate esters of polyhydric alcohols and monocarboxylic acids, such as pentaerythritol tetracaproate, and the like. Useful Ucon fluids are Ucon 50HB170, Ucon 50HB660 or Ucon LB550X, which are copolymers of ethylene oxide and 1,2-propylene oxide; the diols as well as their mono- and dialkyl ethers are useful. The hydrocarbon oils may be blended with fixed oils such as castor oil, lard oil and the like and/or synthetic oils as mentioned or silicone polymers and the like. Typical useful oils are petroleum motor oils (A) and (B), characterized below, (A) being paraffinic in character and (B) naphthenic in character:

| Properties | (A) (SAE 10W) | (B) (SAE 30) |
|---|---|---|
| Pour point, ° F | −10 | −5 |
| Flash, ° F | 390 | 415 |
| Viscosity, SUS at 210° F | 44 | 58 |
| Viscosity Index | 90 | 60 |

Other suitable oils are 1010 and 1065 specification gas turbine lube oils having the following properties:

| Grade | 1010 | 1065 |
|---|---|---|
| Flash, COC, ° F | 300 | 465 |
| Pour point, ° F | −10 | 0 |
| Viscosity, SUS at 100° F | 59.4 | 530 |
| Neutral Number | 0.02 | 0.01 |
| Ash | None | None |

Composition A: Percent
   Example I additive _____ 2
   1010 neutral mineral oil _____ Essentially balance
Composition B:
   Example II additive _____ 2
   1010 neutral mineral oil _____ Essentially balance
Composition C:
   Example III additive _____ 2
   1010 mineral oil _____ Essentially balance
Composition D:
   Example IV additive _____ 5
   Mineral oil (SAE 30) _____ Essentially balance
Composition E:
   Example V additive _____ 1
   1010 mineral oil _____ Essentially balance
Composition F:
   Example I additive _____ 3
   SAE 90 mineral oil _____ Essentially balance
Composition G:
   Example I additive _____ 2
   Di-2-ethyl hexyl sebacate _____ Essentially balance
Composition H:
   Example I additive _____ 5
   Ucon 50HB660 (polyethylene - propylene glycol having a SUS viscosity at 100° F. of 660) _____ Essentially balance
Composition I:
   Example A additive _____ 5
   Di-2-ethylhexyl sebacate _____ Essentially balance Compositions of this invention and other compositions were evaluated for their ability to impart to mineral oil (1) detergency as determined by the Carbon Black Dispersency Test described in the Journal of Colloid Science, vol. 12, October 1957, No. 5, pages 500–522; at 100° C. and 5 r.p.m.; and (2) anti-wear properties using Oldsmobile Tappet Wear Test Ring under GM—MS Test conditions (2500 r.p.m., 300 number valve open spring load described in the AMA proposed specification for evaluation of oils for API Service classification MS presented at SAE meeting, Atlantic City, New Jersey, June 1958). The results are shown in Table II.

TABLE II

| Composition | Detergency (deflocculating ability), ohms | GM-MS Test | |
|---|---|---|---|
| | | Av. lifter [a] visual rating | Av. Cam Wear, thousandths of an inch |
| (1) 100 Neutral mineral oil | 3×10³ | 5 | 44 |
| (2) (1)+2% Ca petroleum sulfonate | 3.3×10³ | 5 | 44 |
| (3) (1)+2% C₈₋₁₈ alkyl methacrylate copolymer | 3×10³ | 5 | 44 |
| (4) Composition A (present invention) | 12×10³ | 9 | 0 |

[a] 10=perfect.

From the test results the superiority of compositions of the present invention to oils containing conventional detergents (2) or polymers (3) with respect to detergency, cleanliness and wear inhibition is clearly evidenced. Thus, a representative composition of the present invention (4) is about 4 times as effective as a detergent as are compositions (2) and (3) or a neat oil (1), twice as effective in preventing sludge and many more times effective as a wear inhibitor than that of compositions (1), (2) or (3).

The polymers of this invention are useful also for providing superior load-carrying properties in lubricating oils which contain minor amounts of other agents which are non-reactive with the polymer, such as silicone antifoaming agents, alkylphenol anti-oxidants, polyacrylate ester viscosity-index improvers, and the like.

I claim as my invention:

1. A lubricating oil composition comprising a major amount of lubricating oil and from about 0.1% to about 10% of an oil-soluble polyphosphonated elastomeric ethylene/propylene copolymer in which the phosphono units are represented by

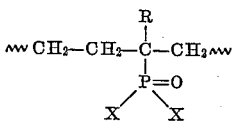

where R is a $C_{1-4}$ alkyl radical, the X's are polar groups selected from the group consisting of halogen and OR' and R' is a radical selected from the group consisting of hydrogen and hydrocarbyl radical and comprise 10–40% of the copolymer and the molecular weight of the copolymer ranges from about 10,000 to about 500,000.

2. The lubricating composition of claim 1 where the lubricating oil is a mineral lubricating oil and the phosphono units in the copolymer are units represented by:

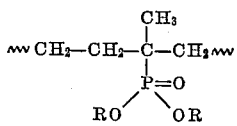

where the R's are hydrocarbyl radicals and the number of such units comprise from 10% to 40% of the ethylene/propylene copolymer.

3. The lubricating compositon of claim 1 where the lubricating oil is a mineral lubricating oil and the phosphono units in the copolymer are units represented by:

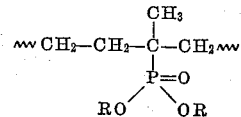

where one of the R's is hydrogen and the other R is an alkyl radical and the number of such units comprise from 10% to 40% of the ethylene/propylene copolymer.

4. The lubricating composition of claim 1 where the lubricating oil is a mineral lubricating oil and the phosphono units in the copolymer are units represented by:

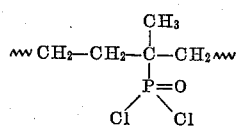

5. The lubricating composition of claim 1 where the lubricating oil is a mineral lubricating oil and the phosphono units in the copolymer are mixtures of units represented by

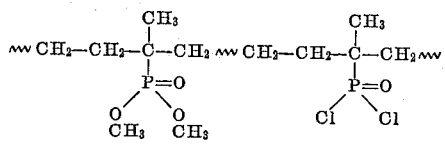

References Cited in the file of this patent
UNITED STATES PATENTS

| | | |
|---|---|---|
| 2,557,805 | Upson | June 19, 1951 |
| 2,571,332 | Brooks | Oct. 16, 1951 |
| 2,636,027 | Coover et al. | Apr. 21, 1953 |
| 2,682,522 | Coover et al. | June 29, 1954 |
| 2,712,528 | Hill et al. | July 5, 1955 |
| 2,736,707 | Morris | Feb. 28, 1956 |
| 2,829,137 | Yolles | Apr. 1, 1958 |
| 2,854,434 | Beaman | Sept. 30, 1958 |
| 2,900,378 | Miller | Aug. 18, 1959 |
| 2,914,515 | Stuart | Nov. 24, 1959 |
| 2,918,457 | Jezl | Dec. 22, 1959 |
| 2,939,841 | Buckmann | June 7, 1960 |
| 3,008,939 | Schroeder et al. | Nov. 14, 1961 |